(12) United States Patent
Woodham

(10) Patent No.: US 7,448,532 B2
(45) Date of Patent: Nov. 11, 2008

(54) 360 DEGREE ROTATABLE LIFTER ARM FOR LOG SINGULATOR

(75) Inventor: Van Woodham, Theodore, AL (US)

(73) Assignee: PSI Sales, Inc., Theodore, AL (US)

( * ) Notice: Subject to any disclaimer, the term of this patent is extended or adjusted under 35 U.S.C. 154(b) by 0 days.

(21) Appl. No.: 11/271,510

(22) Filed: Nov. 10, 2005

(65) Prior Publication Data

US 2006/0113004 A1    Jun. 1, 2006

Related U.S. Application Data

(63) Continuation of application No. 10/365,037, filed on Feb. 12, 2003, now Pat. No. 7,025,251, which is a continuation of application No. 09/712,849, filed on Nov. 14, 2000, now Pat. No. 6,543,498.

(60) Provisional application No. 60/164,968, filed on Nov. 15, 1999.

(51) Int. Cl.
*B26D 5/38*    (2006.01)
*B27B 1/00*    (2006.01)
*B27B 31/00*   (2006.01)

(52) U.S. Cl. ............................ 234/38; 234/59; 83/75.5; 83/370; 83/425.3; 144/242.1; 144/245.1; 144/250.25; 144/370

(58) Field of Classification Search .................. 83/75.5, 83/370, 425.2, 425.3, 425.4, 508.3, 580.1, 83/76.8; 234/38, 42, 43, 59, 76; 144/379, 144/250.25, 245.5, 242.1

See application file for complete search history.

(56) References Cited

U.S. PATENT DOCUMENTS

| 1,608,876 A | 11/1926 | Davis et al. |
| 3,228,440 A | 1/1966 | Ferrabee |
| 3,937,114 A | 2/1976 | Joensson et al. |
| 4,005,625 A | 2/1977 | Brochu et al. |
| 4,031,788 A | 6/1977 | Boge et al. |
| 4,031,790 A | 6/1977 | Arvidsson |

(Continued)

FOREIGN PATENT DOCUMENTS

CA    2277249    1/2000

OTHER PUBLICATIONS

Memorandum regarding apparatuses allegedly installed at sawmills in Vanderhoof and Grande Prairie, Canada; pp. 8-12.

(Continued)

*Primary Examiner*—Jason Prone
(74) *Attorney, Agent, or Firm*—Alston & Bird LLP

(57) ABSTRACT

The present invention discloses a log sawing system comprising multiple cutting blades. The multiple cutting blades are positioned to cut laterally or perpendicular to the centerline of the log which is to be cut. The logs are transported into cutting position using some type of log positioner. The multiple cutting blades are rotatably mounted on an arm which is pivotally mounted on a shaft in groups, being driven by an electrical or like motor, all of which are mounted onto a platform positioned adjacent to the log to be cut. Hydraulic lifters are used to partially rotate the saw blades into the cutting position adjacent the log. Means utilizing a computer and lasers are provided to develop a log cutting solution to best utilize the logs.

25 Claims, 9 Drawing Sheets

U.S. PATENT DOCUMENTS

| | | | |
|---|---|---|---|
| 4,040,459 | A | 8/1977 | Bush, Jr. et al. |
| 4,117,755 | A | 10/1978 | Hasenwinkle et al. |
| 4,185,672 | A | 1/1980 | Vit et al. |
| 4,277,999 | A | 7/1981 | Conner et al. |
| 4,330,019 | A | 5/1982 | Murphy et al. |
| 4,468,993 | A | 9/1984 | McCown et al. |
| 4,640,160 | A | 2/1987 | Hards |
| 5,142,955 | A | 9/1992 | Hale |
| 5,174,351 | A | 12/1992 | Lindenblatt et al. |
| 5,201,354 | A | 4/1993 | Weissbeck |
| 5,263,522 | A | 11/1993 | Sasko |
| 5,351,729 | A | 10/1994 | Brisson |
| 5,408,907 | A | 4/1995 | Mains |
| 5,579,671 | A | 12/1996 | Bowlin |
| 5,638,878 | A | 6/1997 | Weirathmueller |
| 5,653,570 | A | 8/1997 | Weirathmueller |
| 5,785,102 | A | 7/1998 | Hamel |
| 5,865,080 | A | 2/1999 | Jackson |
| 6,032,564 | A | 3/2000 | Bowlin |
| 6,279,441 | B1 | 8/2001 | Streblow |
| 6,305,259 | B1 | 10/2001 | Whitworth et al. |
| 6,382,067 | B1 * | 5/2002 | Gagnon ........................ 83/371 |
| 6,543,498 | B1 * | 4/2003 | Woodham .................... 144/379 |
| 6,779,648 | B2 * | 8/2004 | Woodham ................. 198/463.1 |
| 6,779,649 | B2 * | 8/2004 | Woodham ................. 198/463.5 |
| 6,978,879 | B2 * | 12/2005 | Woodham ................. 198/463.1 |
| 7,021,451 | B2 * | 4/2006 | Woodham ................. 198/463.1 |
| 7,025,251 | B2 * | 4/2006 | Woodham ..................... 234/38 |
| 7,152,728 | B2 * | 12/2006 | Woodham ................. 198/463.1 |
| 2005/0274434 | A1 * | 12/2005 | Woodham .................... 144/359 |
| 2008/0017276 | A1 * | 1/2008 | Woodham .................... 144/359 |

OTHER PUBLICATIONS

Sequential pictures from video of sawmill; 30 pages.
CD with video of sawmill, Log Trimming USA.wmv.
Sequential pictures from video of sawmill (cite 4, above); 30 pages.
Color photographs of an apparent saw mill in Vanderhoof, British Columbia, allegedly in operation sometime prior to Nov. 15, 1999, 6 pages, labeled COM 0001-0006.
Color photograph of "Log Merchandiser Saw Gallery (K)" from www.woodproengineering.com website at http://www.woodproengineering.com/equipment/equipment.html, 1 page, labeled COM 0007.
Color photograph of an apparent saw mill located at James F. Shuler Lbr. Co. in Riceboro, Georgia, allegedly in operation in 1998, 1 page, labeled COM 0008.
Color photograph allegedly from "Lumber Manufacturing," Williston, 1976, showing Sidewise bucking of logs to stud length at multiple saw bucking station of Louisiana Pacific mill at Moyie Springs, Idaho, 1 page, labeled COM 0009.
Defendant's Responses To Plaintiff's First Set Of Interrogatories, Dec. 16, 2004, pp. 1-10.
CD with video of sawmill, Log Trimming USA.wmv; two videos of Weyerhaeuser Green Mountain Log Merchandizer at Toutle, Washington, taken Aug. 8, 2005 and titled Weyerhaeuser1.mpg and Weyerhaeuser2.mpg.
Sequential pictures from Log Trimming USA.wmv video (cite 4, above); 32 pages.
Sequential pictures from Weyerhaeuser1.mpg video (cite 4, above); 19 pages.
Sequential pictures from Weyerhaeuser2.mpg video (cite 4, above); 44 pages.
Color photographs of Weyerhaeuser Green Mountain Log Merchandizer at Toutle, Washington, taken Aug. 8, 2005; 32 pages.
Transcript of Video Deposition upon Oral Examination of Donald L. McClinton; Aug. 8, 2005; Toutle Washington; 118 pages.
Exhibit Nos. 1, 2, 4-10, 12-23 to the Deposition of Donald L. McClinton (cite 14, above); 33 pages.
DVD with video Exhibit Nos. 3 and 11 to the Deposition of Donald L. McClinton (cite 14, above).

* cited by examiner

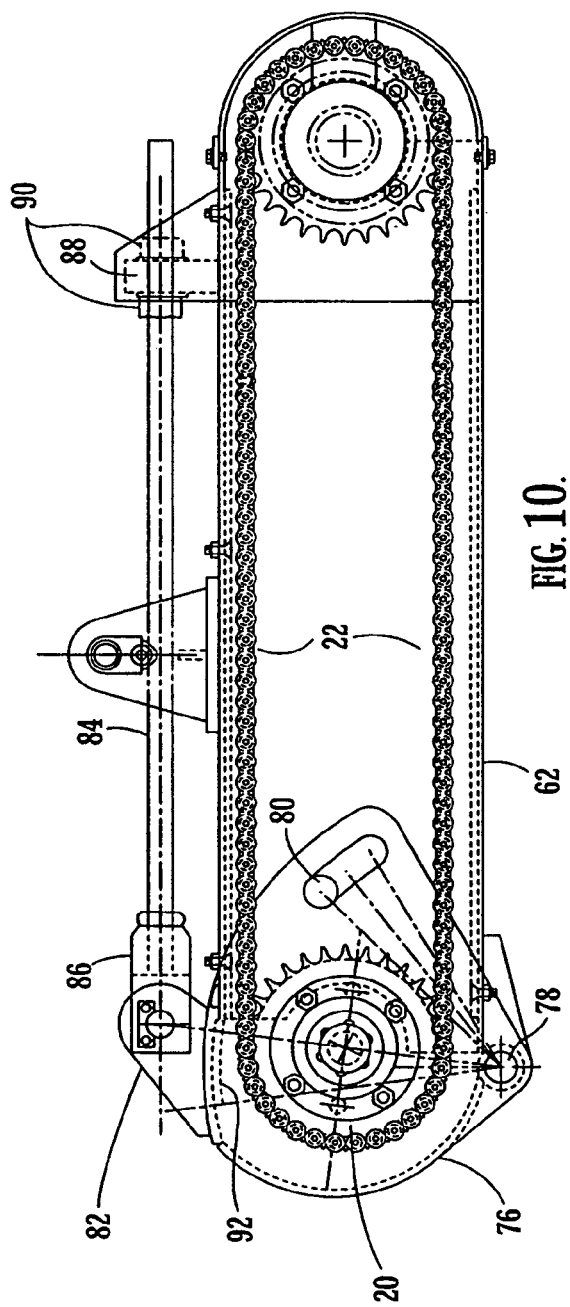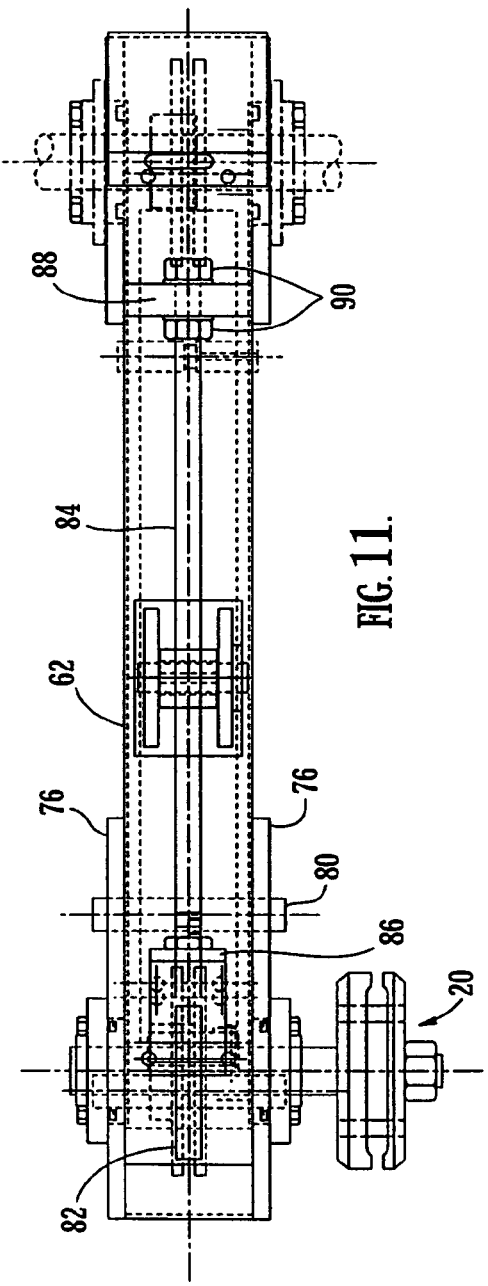

360 DEGREE ROTATABLE LIFTER ARM FOR LOG SINGULATOR

CROSS-REFERENCE TO RELATED APPLICATIONS

This application is a continuation of U.S. application Ser. No. 10/365,037, filed Feb. 12, 2003, now U.S. Pat. No. 7,025, 251, which is a continuation of U.S. application Ser. No. 09/712,849, filed Nov. 14, 2000, now U.S. Pat. No. 6,543, 498, each of which is hereby incorporated herein in its entirety by reference.

This application claims benefit of Provisional Application No. 60/164,968 filed on Nov. 15, 1999.

BACKGROUND OF THE INVENTION

1. Field of the Invention

The present invention relates generally to log cutting systems and, more particularly, is concerned with a multi-blade log cutting system.

2. Description of the Prior Art

Log sawing systems have been described in the prior art. However, none of the prior art devices disclose the unique features of the present invention. It is felt that an efficient log sawing system utilizing multi-cutting blades would be useful and is needed.

In U.S. Pat. No. 4,117,755, dated Oct. 3, 1978, Hasenwinkle and Wislocker described a log sawing and transport system for relatively small logs which has an infeed and loading station where logs are positioned in a centering device for aligning the logs with respect to the saws. Once the log is properly aligned for axial movement, a set of end dogs is actuated to hold the log in its prealigned position for transport. The dogs are mounted within axially movable carriage units that travel the length of the system serving to transport the log axially in a straight line. At the sawing station a plurality of angularly arranged saws are disposed to divide the traveling log into a plurality of elongated sector-shaped pieces. At least one selected saw may be adjustable with respect to the other saws in order to set angles for the sector-shaped pieces; an outfeed device collects the elongated sector-shaped pieces and transports them out of the system.

In U.S. Pat. No. 4,277,999, dated Jul. 14, 1981, Conner and Conner described an upright rectangular frame that longitudinally journals an axle supporting a plurality of spaced-apart circular saws. The axle is V-belt driven by an engine at one end of the frame. A feed conveyor, disposed laterally of the frame, moves logs deposited thereon toward the saws in response to manually operated lever moving an idler pulley and tightening a flat belt entrained around a feed conveyor driving pulley and frictionally engaging a pulley on the axle. The sawed logs are moved out of the frame by a belt conveyor.

In U.S. Pat. No. 4,005,625, dated Feb. 1, 1977, Brochu and Brochu described a tree slasher in which the entire trunk of a tree may be simultaneously cut into a plurality of selected lengths to meet subsequent processing requirements. The slasher, while large is mobile and may, if desired, be taken to the vicinity of the tree-cutting areas thereby to minimize the distances the tree trunks must be hauled prior to cutting.

While these log cutting systems may be suitable for the purposes for which they were designed, they would not be as suitable for the purposes of the present invention, as hereinafter described.

SUMMARY OF THE INVENTION

The present invention discloses a log sawing system comprising multiple cutting blades. The multiple cutting blades are positioned to cut laterally or perpendicular to the centerline of the log which is to be cut. The logs are transported into cutting position using some type of log positioner. The multiple cutting blades are rotatably mounted on an arm which is pivotally mounted on a shaft in groups, being driven by an electrical or like motor, all of which are mounted onto a platform positioned adjacent to the log to be cut. Hydraulic lifters are used to partially rotate the saw blades into the cutting position adjacent the log. Means utilizing a computer and lasers are provided to develop a log cutting solution to best utilize the logs.

An object of the present invention is to more quickly cut logs into multiple pieces. A further object of the present invention is to make a multiple blade log cutting system economically feasible. A further object of the present invention is to provide a multiple blade log cutting system which makes its cuts perpendicular to the length of the log.

Advantages of the present invention are that it provides a streamlined, compact mechanical line shaft drive system which allows the saw blades to be spaced at about 2 foot (+) or (−) centers so that the center line of the blades are the same. This is important since a 2 foot spacing is the standard cutting length in state of the art log cut-up systems and allows the logs to be cut in one pass without having the log be repositioned to be re-cut on a second pass.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which:

FIG. 10 is an elevation view of the saw arm and chain tension adjustment means.

FIG. 11 is a plan view of the saw arm and chain tension adjustment means.

LIST OF REFERENCE NUMERALS

Figure 2:
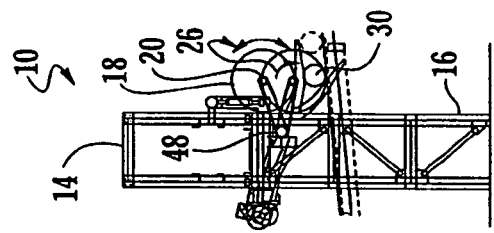
FIG. 2 is a side elevation view of the present invention.

With regard to reference numerals used, the following numbering is used throughout the drawings.

10 present invention
12 frame
14 central frame member
16 end frame member
18 cutting blades
20 rotatable mount
22 blade drive means
24 hydraulic lifters
26 direction arrows
28 log positioner
30 logs
30A log
32 lower elevation
34 higher elevation
36 steps
36A step
38 log positioner lifting arms
38A log positioner lifter arm
40 top step
42 log roller
44 direction arrow
46 direction arrow
48 drive shaft
50 motor drive means
52 drive belt
54 motor drive pulley
56 drive shaft pulley
60 log positioner actuator arms
62 saw arm
64 laser beam
66 log even end
68 anti-pinch arm
70 log positioner liger arm shaft
72 conveyor
74 actuator for anti-pinch arm
76 adjustment flange
78 pivot
80 fail-safe stop pin
82 adjustment arm
84 adjustment rod
86 connecting means for adjustment rod
88 mounting means for adjustment rod
90 threaded fasteners
92 dirt cover

DESCRIPTION OF THE PREFERRED EMBODIMENTS

Turning now descriptively to the drawings, in which similar reference characters denote similar elements throughout the several views, FIGS. 1 through 11 illustrate the present invention being a multi-blade log cutting system.

Figure 1:
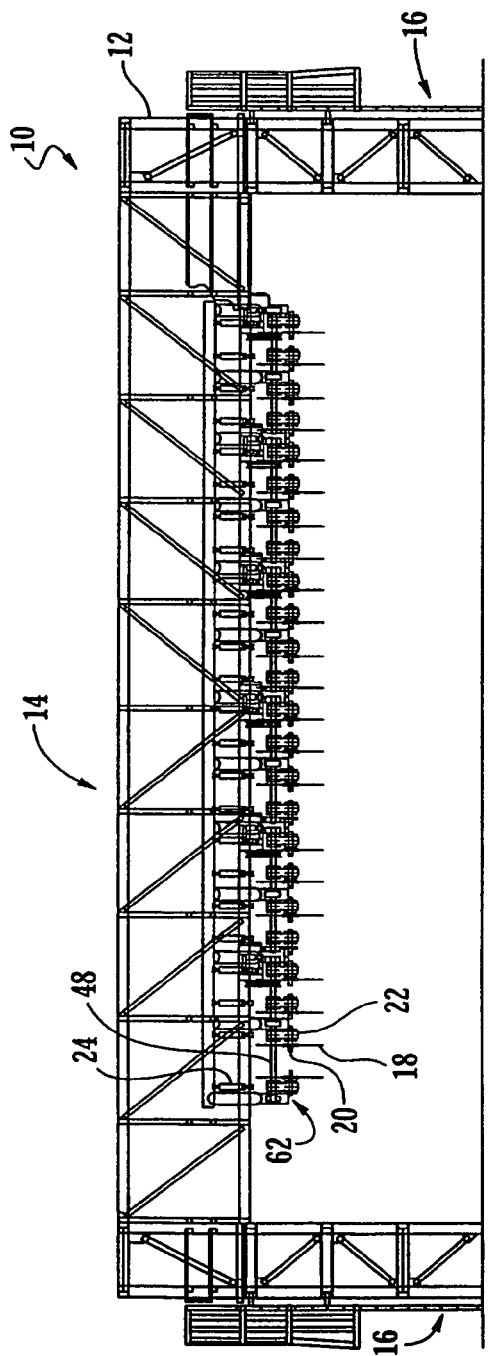
FIG. 1 is a front elevation view of the present invention.
Figure 8:
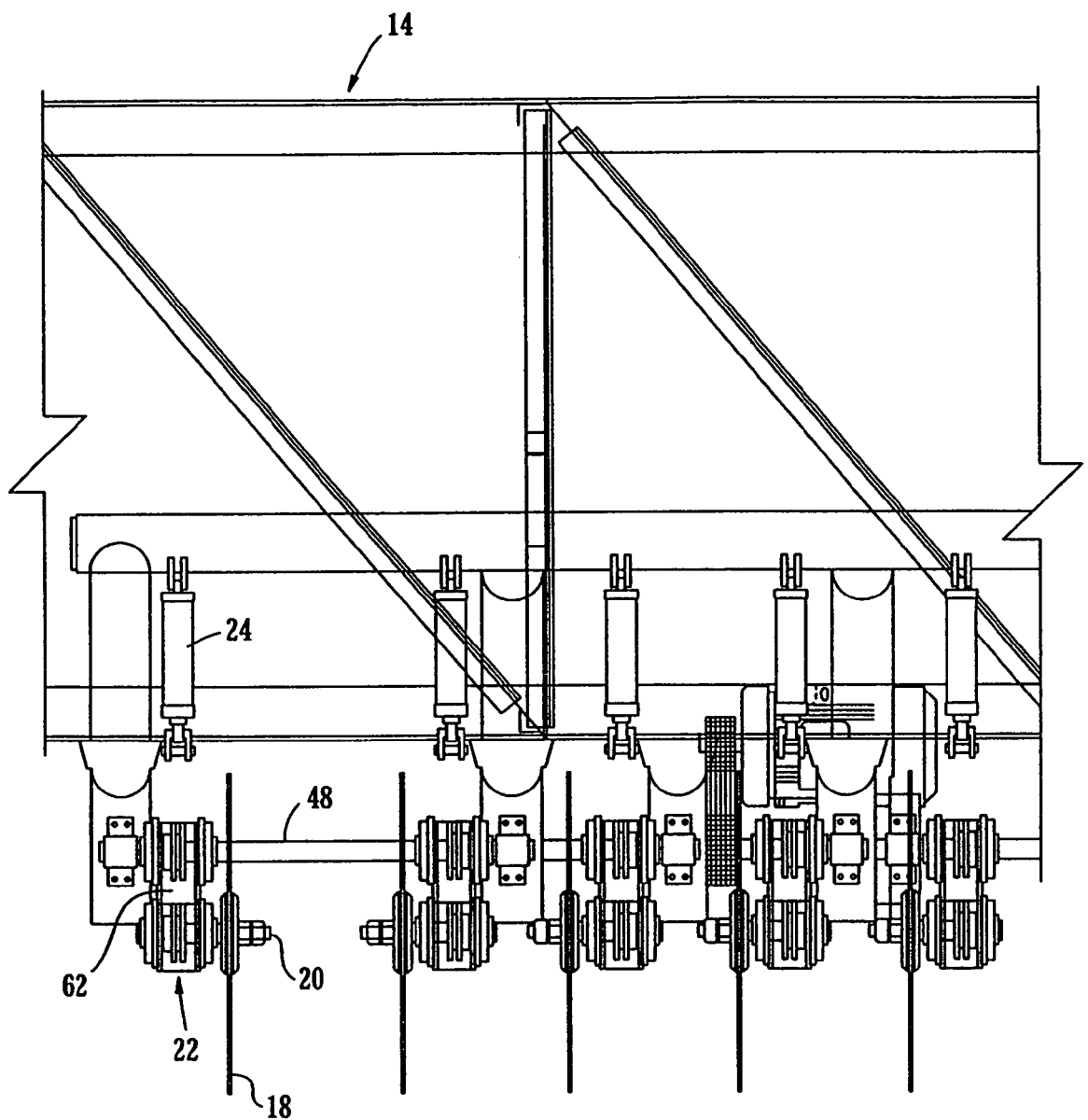
FIG. 8 is an enlarged view of portions of the present invention taken from FIG. 1.

Turning to FIGS. 1 and 8, therein is shown a front elevation view of the present invention 10. Therein is shown the support frame 12 generally having a horizontal central cross member 14 along with a pair of leg-like supports on each end 16. The central member is approximately 65 feet long which is large enough to accommodate tree-length logs and the end members 16 are about 22 feet high. Also shown therein are the multiple cutting blades 18 being rotatably mounted 20 having rotatable drive means 22. Also shown therein are hydraulic lifting means 24, which could use air or fluid for operation, which are used to raise and lower the blade 18 into the proper cutting position. Drive shaft 48 and multiple saw arm 62 are also shown.

Turning to FIG. 2, therein is shown a side elevation view of the present invention 10. Shown is the end frame supports 16 along with the central frame support 14. The sawblades 18 are shown being partially rotatable about shaft 48 as shown by direction arrow 26. It can be seen that the blades have rotatable mounting means 20. A log 30 is shown within the cutting arch of blade 18.

Figure 3:
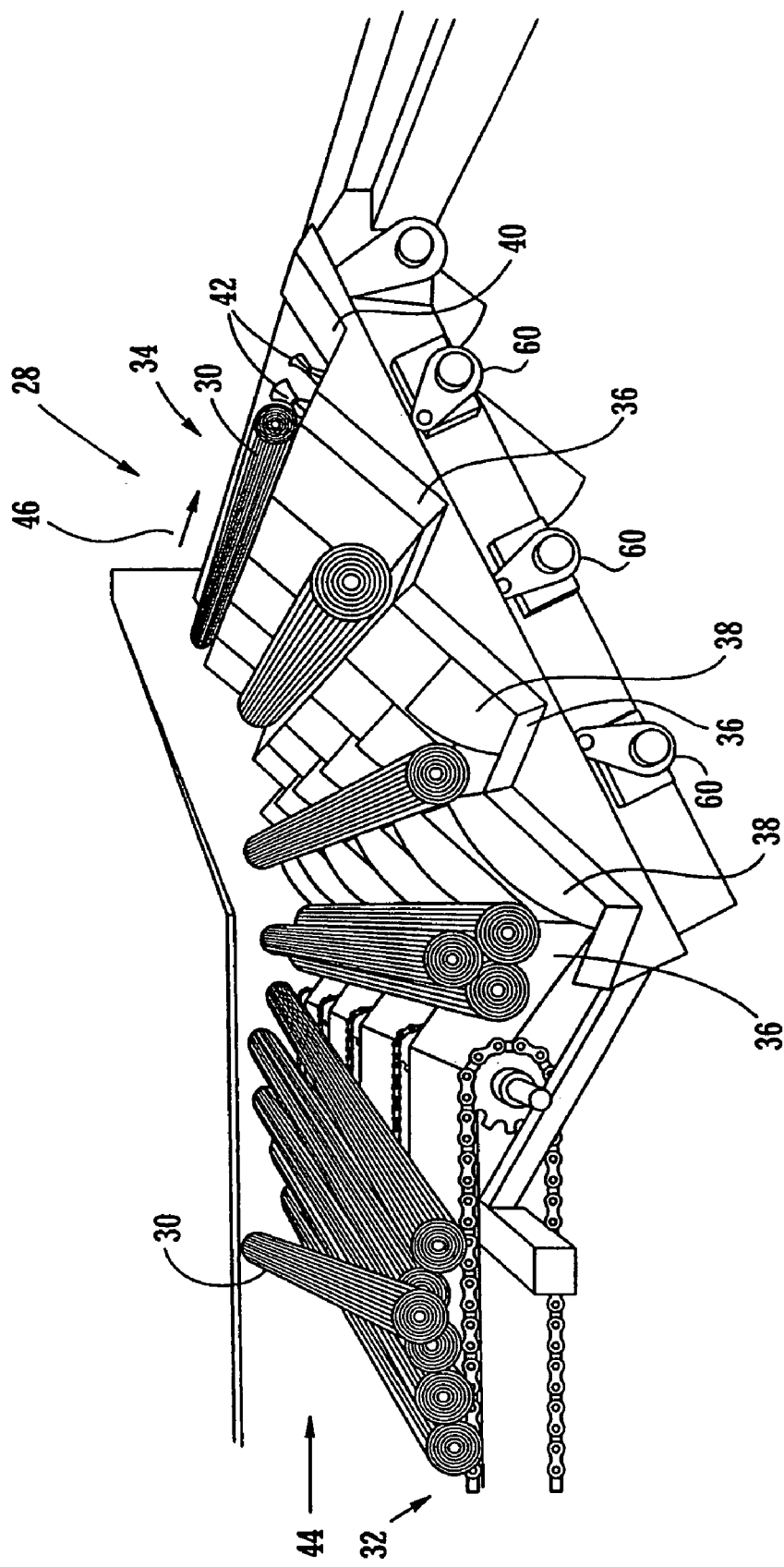
FIG. 3 is a perspective view of an exemplary log positioner portion of the present invention.

Turning to FIG. 3, therein is shown a side perspective view of a typical exemplary log positioner generally shown at 28 which might be used in conjunction with the present invention which positioner is used to move logs toward the cutting blades. However, the present invention could be used with many different types of log positioners different from that shown here. The log positioner 28 is a device which lifts logs 30 from a lower elevation or infeed 32 to a higher elevation 34 using a series of multiple steps 36 and multiple lifting arms 38 which arms 38 are reciprocated by multiple actuator arms 60 or the like which arms 60 reciprocate arms 38. Note that at the top step 40 of the log positioner there are multiple rollers 42 located in the bottom of the step 40 which changes the direction of movement of the log from being as shown by direction arrow 44, i.e., perpendicular to the center line of log 30 to that direction shown by arrow 46, i.e., parallel to the center line of log 30. When the log 30 is placed into the top step 40, the log 30 is nearly in position to be cut by the multiple cutting blades of the present invention.

Figure 4:
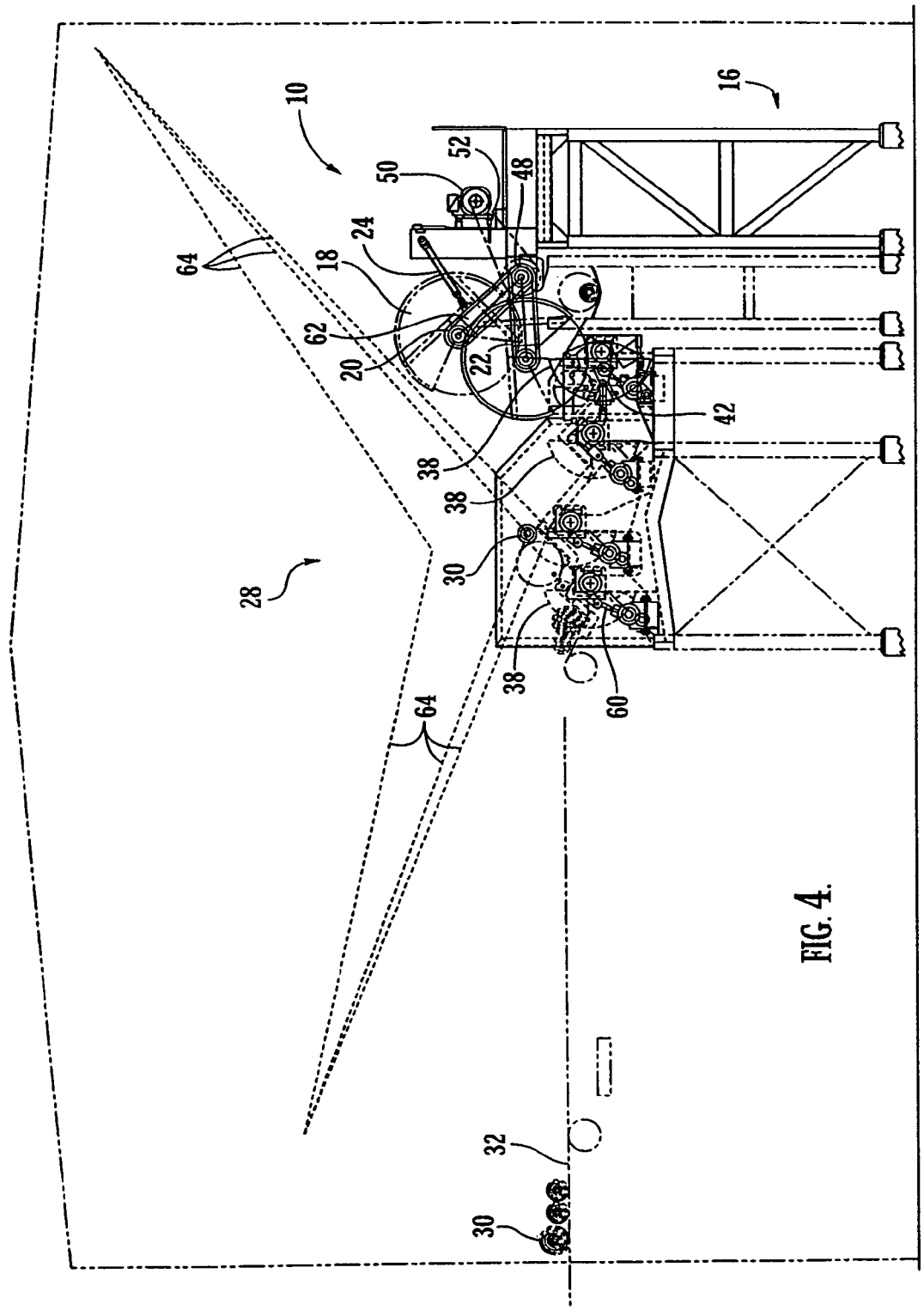
FIG. 4 is a side elevation view of the present invention in operative connection with a log positioner.

Turning to FIG. 4, therein is shown a side elevation view of the present invention 10 in operative connection with the log positioner 28. The multiple lifting arms 38 of the log positioner 28 are shown along with multiple actuator arms 60 with the logs 30 being also shown. The log rollers 42 are also shown. Also shown are the cutting blades 18 along with their rotatable mount means 20, saw arm 62, lifter arm 24 for moving the arm up or down, drive means being drive chains or belts 22 having a drive means connected to the central drive shaft 48 with a main motor drive means 50 with a drive means, i.e., chain or belt 52. Logs 30 are moved from infeed 32 toward saw blades 18 by the log positioner 28. As logs 30 move near the cutting blades 18, the logs pass through a system of multiple laser beams 64 generated by a laser beam generation and information management system (not shown) in such a way that the laser beam system 64 develops a log contour which information is fed into a computer system which yields a log sawing solution so that the most efficient and best utilization of the log is accomplished. The computer system then actuates the appropriate number of saw blades 18 so that the log can be properly cut.

Figure 5:
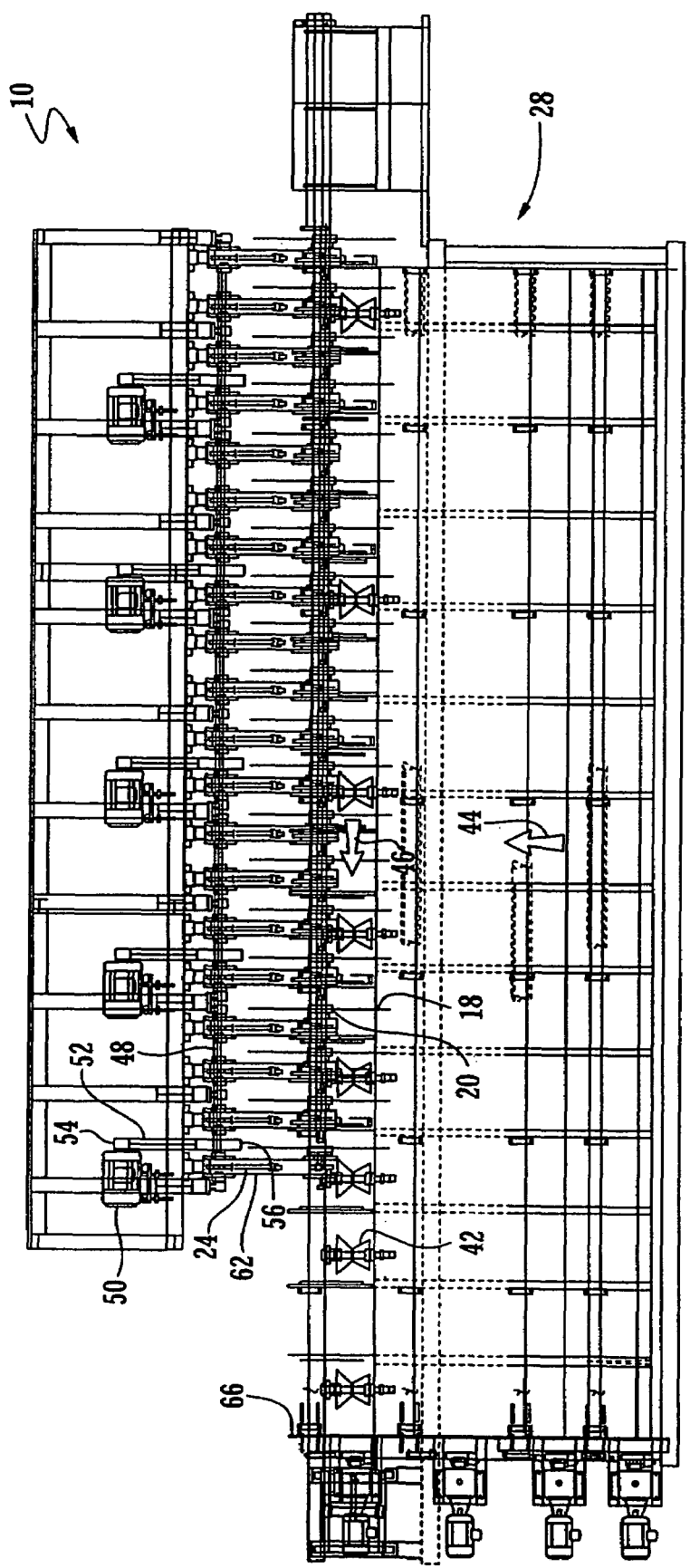
FIG. 5 is a plan view of the present invention in operative connection with a log positioner.
Figure 9:
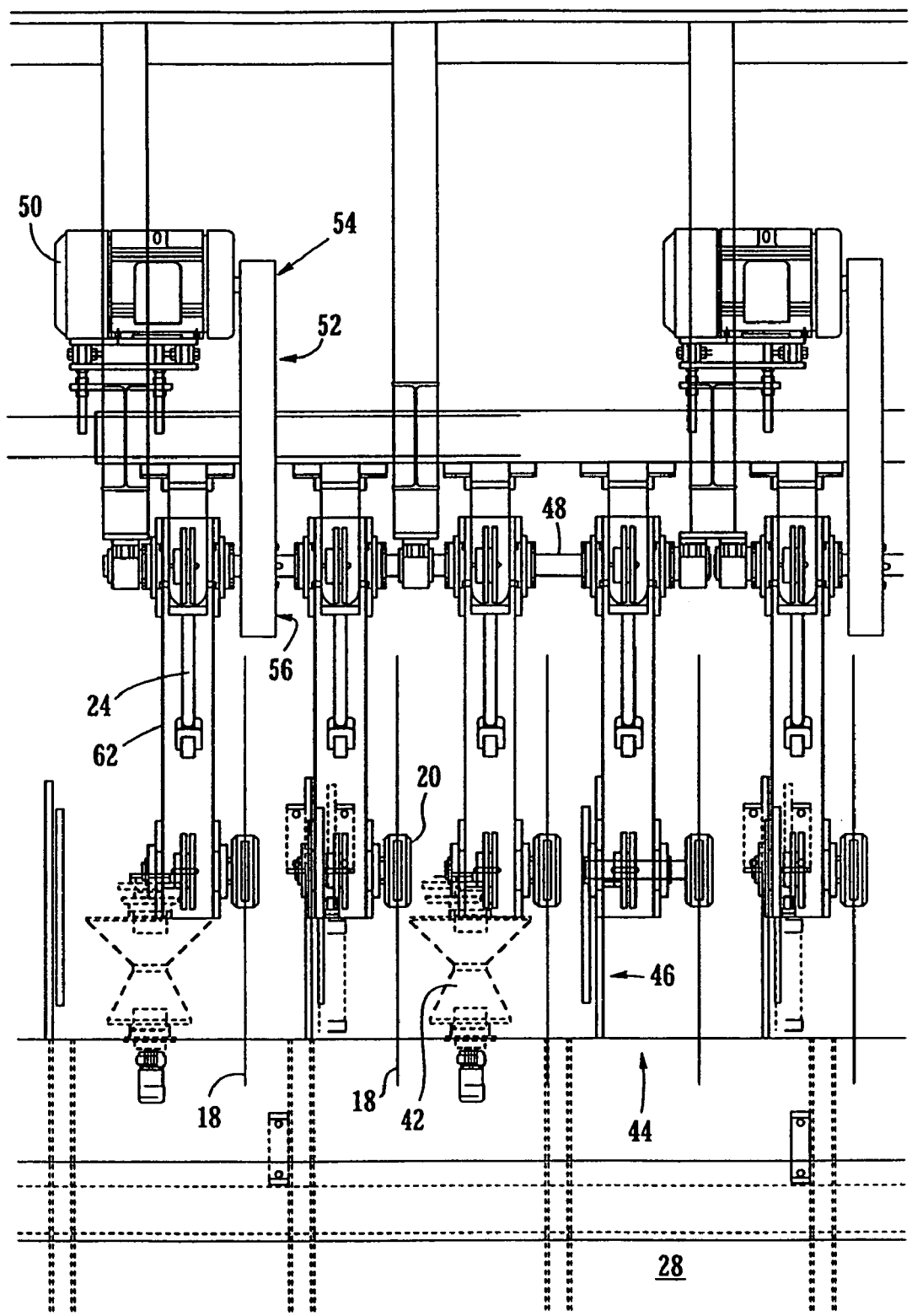
FIG. 9 is an enlarged view of portions of the present invention taken from FIG. 5.

Turning to FIGS. 5 and 9, therein is shown a plan view of the present invention 10 mounted adjacent to the log positioner 28. Direction arrow 44 shows the direction of the travel of the logs up the log positioner 28 and direction arrow 46 shows the direction of the log travel on rollers 42. The multiple cutting blades are shown at 18 being rotatably mounted at 20 having a central drive shaft 48 with motor drive means 50 being driven by belt means 52 having a first pulley 54 connected to the motor drive means 50 and a second pulley 56 connected to the drive shaft 48 so that the shaft 48 is rotated. Hydraulic lifters arms 24 are shown connected to the frame and each saw arm 62 so that the arms 24 move saw arms 62 and thus blade 18 up or down. When a log is placed onto rollers 42, the rollers move the end of the log (normally the butt or large end) toward the log even end at 66 so that the logs are always cut from the same reference point. The saw blades 18 are grouped in groups of four so that each drive shaft 48 only has four blades 18 operating therewith. However, any number of blades 18 could be grouped, e.g., 2,3,4,5 or 6, as desired by the user.

Figure 6:
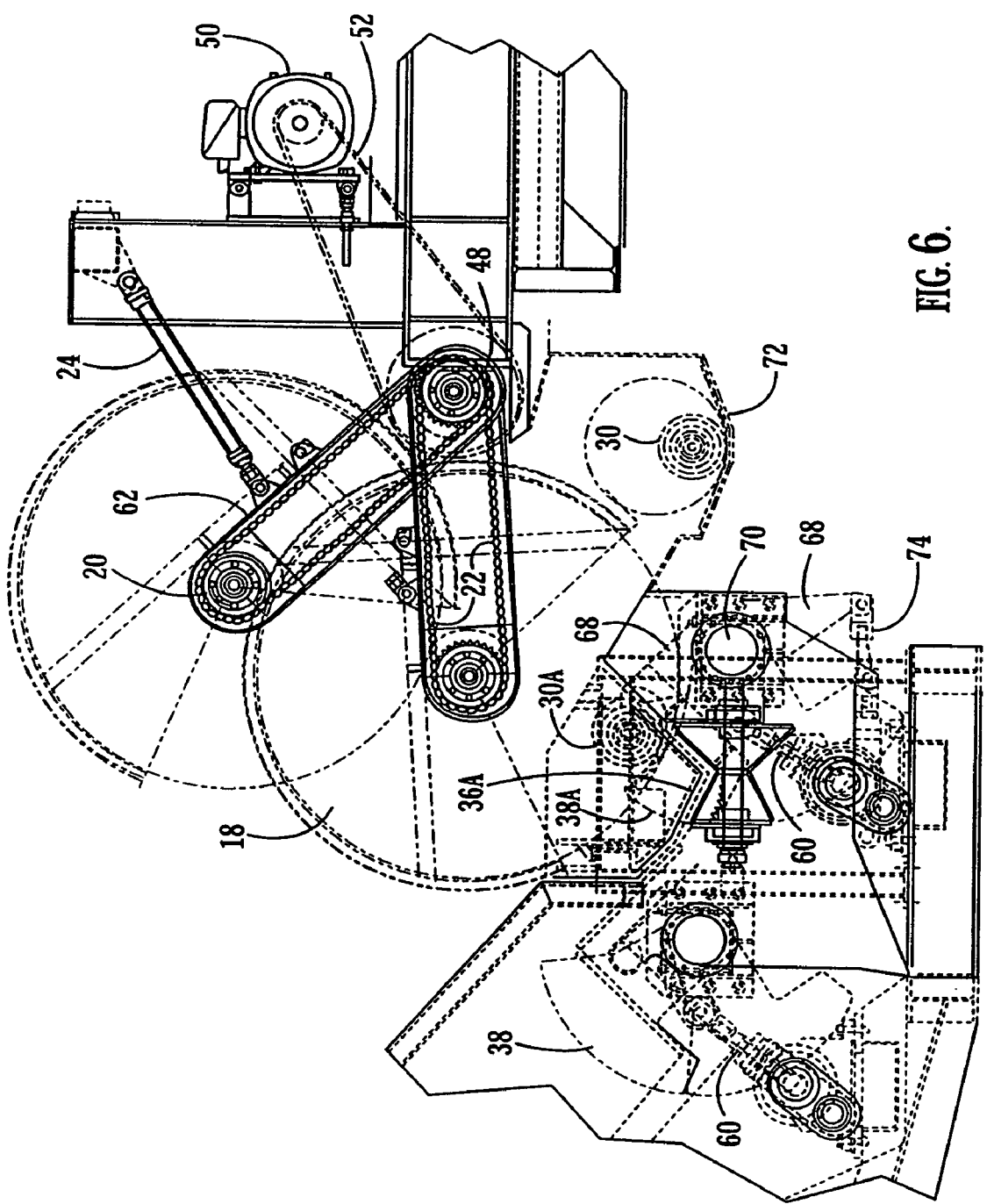
FIG. 6 is an elevation side view of portions of the present invention taken from FIG. 4.

Turning to FIG. 6, therein is shown a side elevation view of portions of the present invention taken from FIG. 4. Shown are the cutting blades 18, rotatable mounts 20, drive shaft 48, motor 50 and other elements previously disclosed. Also shown is an additional clamping member 68 (or anti-pinch arm) which rotates about the same shaft 70 as the lifter arm 38A. Just prior to the log 30A being cut by blade 18, the log is in the bottom of log positioner step 36A. Lifter arm 38A then raises log 30A a few inches, e.g., 6" to 8" or about ½ way, up the upstream face of the step 36A at which point the anti-pinch arm 68 grasps log 30A from the side of log 30A opposite to lifter arm 38A at which time log 30A is tightly secured between lifter arm 38A and anti-pinch arm 68 whereupon the log 30A is then cut by blade 18 (Also see FIG. 7). After cutting, the pieces of log 30A are moved by lifter arms 38A toward conveyor belt 72 which conveys the log pieces away from the cutting blades to other processing points. Hydraulic actuator arms 74 actuate the anti-pinch arms 68. The purpose of the anti-pinch arms 68 are to prevent blade 18 from pinching or binding log 30A during the cutting process.

Figure 7:
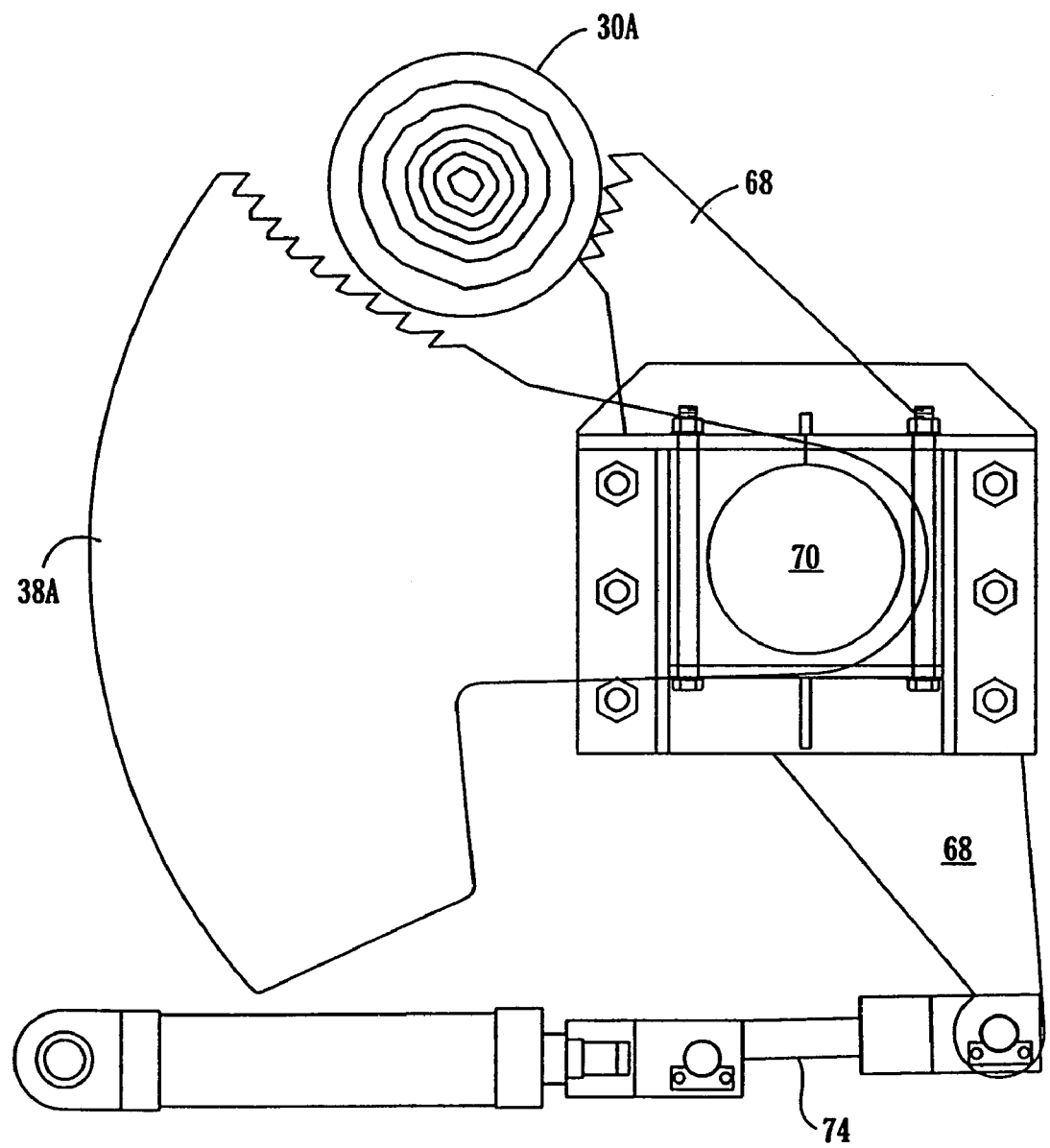
FIG. 7 is an enlarged view of portions of the present invention taken from FIG. 6.

Turning to FIG. 7, therein is shown an enlarged view of portions of the present invention taken from FIG. 6. Elements previously disclosed are shown.

Turning to FIG. 10, therein is shown a plan view of the saw arm 62 having a drive means 22, i.e., a chain, being adjustably tensionable by using a rod 84 mounted onto arm 62 so that the first end 86 of rod 84 is mounted onto and connected to an adjustment arm or lever 82 which is disposed on the chain rotatable means 20 by using an adjustment plate or flange 76 pivotable about a pivot 78. The elongated rod 84 is mounted at the second end on support mount 88 where the rod has threads for receiving mating threaded fasteners or nuts 90 so that by turning one or the other nut(s) 90 in a conventional manner, the length of rod 84 can be adjusted so as to tension chain 22. The flange 76 has a fail-safe stop pin 80 mounted in an aperture therein. Dirt cover 92 is also shown.

Turning to FIG. 11, therein is shown a plan view of the saw arm and chain tension adjustment means 84 showing the saw arm 62 along with the previously disclosed elements.

I claim:

1. An apparatus for cutting a log, the apparatus comprising:
a plurality of rotational drive devices;
a plurality of drive shafts, wherein each drive shaft is a rotationally separate member from the other drive shafts, and each drive shaft is operably connected to a respective one of said drive devices;
a plurality of cutting blades, at least two of said blades being operably connected to each of said drive shafts, each of said cutting blades being moveable between first and second positions such that said cutting blades in the second position are configured to cut the log in a cutting position, each cutting blade operably connected to a respective one of said drive shafts being configured to be moved to the second position while at least one of said blades operably connected to the respective drive shaft is in the first position such that the log in the cutting position is cut by less than all of the cutting blades operably connected to each of said drive shafts; and
a plurality of arms rotatable relative to said drive shafts, each cutting blade being mounted on a respective one of said arms such that rotating each arm moves the respective cutting blade between the first and second positions,
wherein said cutting blades are configured at consecutive positions in a direction generally parallel to a centerline of the log in the cutting position with a nominal distance of 2 feet between adjacent cutting blades.

2. An apparatus for cutting a log, the apparatus comprising:
a plurality of rotational drive devices;
a plurality of drive shafts, wherein each drive shaft is a rotationally separate member from the other drive shafts, and each drive shaft is operably connected to a respective one of said drive devices; and
a plurality of cutting blades, at least two of said blades being operably connected to each of said drive shafts, each of said cutting blades being moveable between first and second positions such that said cutting blades in the second position are configured to cut the log in a cutting position, each cutting blade operably connected to a respective one of said drive shafts being configured to be moved to the second position while at least one of said blades operably connected to the respective drive shaft is in the first position such that the log in the cutting position is cut by less than all of the cutting blades operably connected to each of said drive shafts,
wherein said cutting blades are configured at consecutive positions in a direction generally parallel to a centerline of the log in the cutting position with a nominal distance of 2 feet between adjacent cutting blades, and said cutting blades are configurable such that at least two of said cutting blades are moved to the second position while the remaining cutting blades are in the first position such that the log in the cutting position is cut into at least three portions.

3. An apparatus for cutting a log, the apparatus comprising:
a plurality of rotational drive devices;
a plurality of drive shafts, wherein each drive shaft is a rotationally separate member from the other drive shafts, and each drive shaft is operably connected to a respective one of said drive devices;
a plurality of cutting blades, at least two of said blades being operably connected to each of said drive shafts, each of said cutting blades being moveable between first and second positions such that said cutting blades in the second position are configured to cut the log in a cutting position, each cutting blade operably connected to a respective one of said drive shafts being configured to be moved to the second position while at least one of said blades operably connected to the respective drive shaft is in the first position such that the log in the cutting position is cut by less than all of the cutting blades operably connected to each of said drive shafts; and
a log even end configured to restrain a motion of an end of the log in a direction parallel to the centerline of the log such that the end of the log in the cutting position is about an even integer number of feet from the second position of each cutting blade,
wherein said cutting blades are configured at consecutive positions in a direction generally parallel to a centerline of the log in the cutting position with a nominal distance of 2 feet between adjacent cutting blades.

4. An apparatus for cutting a log, the apparatus comprising:
a plurality of rotational drive devices;
a plurality of drive shafts, wherein each drive shaft is a rotationally separate member from the other drive shafts, and each drive shaft is operably connected to a respective one of said drive devices; and
a plurality of cutting blades, at least two of said blades being operably connected to each of said drive shafts, each of said cutting blades being moveable between first and second positions such that said cutting blades in the second position are configured to cut the log in a cutting position, each cutting blade operably connected to a respective one of said drive shafts being configured to be moved to the second position while at least one of said blades operably connected to the respective drive shaft is in the first position such that the log in the cutting position is cut by less than all of the cutting blades operably connected to each of said drive shafts, wherein said cutting blades are configured at consecutive positions in a direction generally parallel to a centerline of the log in the cutting position with a nominal distance of 2 feet between adjacent cutting blades, and a cutting blade operably connected to one of said drive shafts is spaced apart by about 2 feet from an adjacent cutting blade operably connected to another of said drive shafts.

5. An apparatus according to claim 4 wherein each drive shaft is configured to rotate independently from the other drive shafts.

6. An apparatus according to claim 4 wherein each of said blades is operably connected to the respective drive shaft by a chain.

7. An apparatus according to claim 4 wherein more than two of said blades are mounted on each of said drive shafts.

8. An apparatus according to claim 4 wherein exactly three of said blades are mounted on each of said drive shafts.

9. An apparatus according to claim 4 wherein exactly four of said blades are mounted on each of said drive shafts.

10. An apparatus according to claim 4 wherein each cutting blade is a rotatable saw blade.

11. An apparatus according to claim 4 further comprising a plurality of arms rotatable relative to said drive shafts, each cutting blade being mounted on a respective one of said arms such that rotating each arm moves the respective cutting blade between the first and second positions.

12. An apparatus according to claim 4 wherein said cutting blades are configurable such that at least two of said cutting blades are moved to the second position while the remaining cutting blades are in the first position such that the log in the cutting position is cut into at least three portions.

13. An apparatus according to claim 4 further comprising a log even end configured to restrain a motion of an end of the log in a direction parallel to the centerline of the log such that the end of the log in the cutting position is about an even integer number of feet from the second position of each cutting blade.

14. An apparatus for cutting a log, the apparatus comprising:
a plurality of rotational drive devices;
a plurality of drive shafts, wherein each drive shaft is a rotationally separate member from the other drive shafts, and each drive shaft is operably connected to a respective one of said drive devices; and
a plurality of rotatable saw blades, at least two of said blades being operably connected to each of said drive shafts, each of said saw blades being moveable between first and second positions such that said saw blades in the second position are configured to cut the log in a cutting position, each saw blade operably connected to a respective one of said drive shafts being configured to be moved to the second position while at least one of said blades operably connected to the respective drive shaft is in the first position such that the log in the cutting position is cut by less than all of the saw blades operably connected to each of said drive shafts,
wherein said saw blades are configured at consecutive positions in an axial direction generally parallel to a centerline of the log in the cutting position with a blade separation distance between adjacent saw blades, the blade separation distance being less than a length of each drive device in the axial direction.

15. An apparatus according to claim 14 wherein each drive shaft is configured to rotate independently from the other drive shafts.

16. An apparatus according to claim 14 wherein each of said blades is operably connected to the respective drive shaft by a chain.

17. An apparatus according to claim 14 further comprising a plurality of arms rotatable relative to said drive shafts, each saw blade being mounted on a respective one of said arms such that rotating each arm moves the respective saw blade between the first and second positions.

18. An apparatus according to claim 14 wherein said saw blades are configured at consecutive positions in a direction generally parallel to a centerline of the log in the cutting position, and wherein at least some of said saw blades are spaced apart by about a predetermined distance that can be divided into standard cut lengths of logs and equal a whole number.

19. An apparatus according to claim 18 wherein the predetermined distance is 2 feet.

20. An apparatus according to claim 19 wherein a saw blade operably connected to one of said drive shafts is spaced apart by about said predetermined distance from an adjacent saw blade operably connected to another of said drive shafts.

21. An apparatus according to claim 18 wherein each of said plurality of saw blades rotatably connected to a respective drive shaft are spaced from each other by about said predetermined distance.

22. An apparatus according to claim 21 wherein said predetermined distance is 2 feet.

23. An apparatus according to claim 18 wherein said saw blades are configurable such that at least two of said saw blades are moved to the second position while the remaining saw blades are in the first position such that the log in the cutting position is cut into at least three portions.

24. An apparatus according to claim 18 further comprising a log even end configured to restrain a motion of an end of the log in a direction parallel to the centerline of the log such that the end of the log in the cutting position is about an even integer number of feet from the second position of each saw blade.

25. An apparatus for cutting a log, the apparatus comprising:
a plurality of rotational drive devices;
a plurality of drive shafts, wherein each drive shaft is a rotationally separate member from the other drive shafts, and each drive shaft is operably connected to a respective one of said drive devices; and
a plurality of cutting blades, at least two of said blades being operably connected to each of said drive shafts, each of said cutting blades being moveable between first and second positions such that said cutting blades in the second position are configured to cut the log in a cutting position,
wherein each cutting blade operably connected to a respective one of said drive shafts is configured to be moved to the second position while at least one of said blades operably connected to the respective drive shaft is in the first position such that the log in the cutting position is cut by less than all of the cutting blades operably connected to each of said drive shafts, each of said blades being operably connected to the respective drive shaft by a chain.

* * * * *